(12) United States Patent
Fan et al.

(10) Patent No.: US 7,817,835 B2
(45) Date of Patent: Oct. 19, 2010

(54) CROSS REFERENCE MEASUREMENT FOR DIAGNOSTIC MEDICAL IMAGING

(75) Inventors: Liexiang Fan, Sammamish, WA (US); Carol Lowery, Issaquah, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 876 days.

(21) Appl. No.: 11/728,686

(22) Filed: Mar. 26, 2007

(65) Prior Publication Data

US 2007/0230758 A1 Oct. 4, 2007

Related U.S. Application Data

(60) Provisional application No. 60/787,772, filed on Mar. 31, 2006.

(51) Int. Cl.
*G06K 9/00* (2006.01)
*A61B 8/00* (2006.01)
(52) U.S. Cl. ................ 382/130; 382/318; 600/437
(58) Field of Classification Search .......... 382/100, 382/106, 107, 128, 129, 130, 131, 132, 133, 382/134, 168, 181, 189, 232, 255–256, 274, 382/276, 286–295, 305, 312, 318; 600/424, 600/443, 300, 437, 453; 715/764; 378/21
See application file for complete search history.

(56) References Cited

U.S. PATENT DOCUMENTS 6,068,598 A * 5/2000 Pan et al. ............... 600/453
6,858,010 B2 * 2/2005 Guracar et al. .......... 600/443
7,296,239 B2 * 11/2007 Shen et al. .............. 715/764
7,505,809 B2 * 3/2009 Strommer et al. ........ 600/424
7,597,663 B2 * 10/2009 Wang et al. ............. 600/437
2003/0164860 A1 9/2003 Shen
2004/0116810 A1 * 6/2004 Olstad .................. 600/443
2004/0138548 A1 7/2004 Strommer
2005/0033123 A1 * 2/2005 Gardner et al. .......... 600/300

FOREIGN PATENT DOCUMENTS

DE 103 92 341 T5 3/2005
DE 103 92 310 T5 4/2005

OTHER PUBLICATIONS

Ashraf Shoma, et al., "Ultrasound for Accurate Measurement of Invasive Breast Cancer Tumor Size", The Breast Journal, vol. 12, Issue 3, May 2006, p. 252 (abstract).

(Continued)

*Primary Examiner*—Seyed Azarian

(57) ABSTRACT

Measurements in diagnostic medical imaging are cross-referenced. A measurement made for one type of data is reflected in an image for another type of data. For example, a length is measured from ultrasound data. A line associated with the length is displayed on the ultrasound image. In a magnetic resonance image (MRI), the same line is displayed at a corresponding location. The same measurement may also be made with the MRI data and reflected in the ultrasound image. Each image shows both measurements in this example. The difference in the same measurements from different types of data may be useful for diagnosis. In the above example, the length is measured from ultrasound and from MRI. The difference between the two measured lengths may provide diagnostically useful information.

21 Claims, 2 Drawing Sheets

OTHER PUBLICATIONS

Shinil K. Shah, et al., "Current Role of Magnetic Resonance Imaging in Breast Imaging: A Primer for the Primary Care Physician", JABFP, Nov.-Dec. 2005, vol. 18, No. 6, pp. 478-490.

Timothy Hall, et al., "Lesion Size Ratio for Differentiating Breast Masses", 2003 IEEE Ultrasonics Symposium, pp. 1247-1250.

U.S. Appl. No. 11/283,436, filed Nov. 18, 2005.

Translation of German Office Action in German application 10 2007 015 527.3-35.

* cited by examiner

CROSS REFERENCE MEASUREMENT FOR DIAGNOSTIC MEDICAL IMAGING

RELATED APPLICATIONS

The present patent document claims the benefit of the filing date under 35 U.S.C. §119(e) of Provisional U.S. Patent Application Ser. No. 60/787,772, filed Mar. 31, 2006, which is hereby incorporated by reference.

BACKGROUND

The present embodiments relate to measurement for diagnostic medical imaging. Distance, area, volume, flow, velocity, acceleration, rate, location, or other measurements may assist in diagnosis. For example, the size of a fetus, lesion, or tumor may be used for diagnosis.

Different types of data may be used for different or the same measurements. Medical imaging includes different scanning modes, such as ultrasound, x-ray, computed tomography, magnetic resonance, or positron emission. For some of these modes, different processing channels are available. For example, ultrasound imaging detects intensity of reflected sound (B-mode), flow (velocity, energy, and/or variance in Doppler or flow mode), fundamental response, harmonic response, or other characteristic. Some modes and channels may provide different information for measurement.

Multi-modality data or multi-channel data are complementary to each other and may be used together in decision-making. In an example of medical imaging measurement applications, two modes of image data are acquired, and the measurements from both image modes are obtained separately. The medical personal use the information for diagnosis. However, there may be some confusion due to the differences in modes or measurement results.

BRIEF SUMMARY

By way of introduction, the preferred embodiments described below include methods, systems, computer readable media, and instructions for cross-referencing measurements in diagnostic medical imaging. A measurement made for one type of data is reflected in an image for another type of data. For example, a length is measured from ultrasound data. A line associated with the length is displayed on the ultrasound image. In a magnetic resonance image (MRI), the same line is displayed at a corresponding location. The same measurement may also be made with the MRI data and reflected in the ultrasound image. Each image shows both measurements in this example.

The same measurements from different types of data may be useful for diagnosis. In the above example, the length is measured from ultrasound and from MRI. The difference between the two measured lengths may provide diagnostically useful information.

Reflection of a measurement associated with one type of data in an image of another type of data and derivation of differences in measurements of a same characteristic from different types of data are used separately or in combination.

In a first aspect, a method is provided for cross-referencing measurements in diagnostic medical imaging. First data of a first type representing a region is obtained, and second data of a second type representing the region is obtained. The first type is different than the second type. A first image is generated as a function of the first data, and a second image is generated as a function of the second data. A first mark location on the first image is determined for a first measurement. The first mark location is reflected on the second image.

In a second aspect, a system is provided for cross-referencing measurements in diagnostic medical imaging. A memory is operable to store first and second sets of data for first and second different modes or imaging system channels, respectively. A processor is operable to identify first and second measurement related locations for a same measurement separately determined from the first and second sets of data, respectively. A display is operable to display first and second images corresponding to the first and second sets of data, respectively, and operable to include indications of the first and second measurement related locations in each of the first and second images.

In a third aspect, a computer readable storage medium has stored therein data representing instructions executable by a programmed processor for cross-referencing measurements in diagnostic medical imaging. The storage medium includes instructions for obtaining data sets of different types of data, the data sets representing a same region of a patient, measuring in a same way from each of the data sets, and determining a difference between the measurements of the data sets of different types of data.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The difference in measurements between different types of images may provide meaningful information for decision-making. Reflecting a measurement from one type of data in an image for another type of data may also provide meaningful information for decision-making. Measurement information from multi-modality or multi-channel data is provided for comparison.

When multi-modality or multi-channel data are acquired, the associated alignment information including scaling, translation, and rotation information is also recorded. Images for the selected dataset may be displayed simultaneously. When a manual measurement operation is applied to one image, the same measurement marks, such as lines or trace, are also simultaneously displayed on the other image. The same color or texture is used for the reflection to easily cross-reference to the initial measurement operations marks. The measurement may be performed based on the other data. The difference of the measurements may be derived and displayed to provide further information for decision-making.

Figure 1:
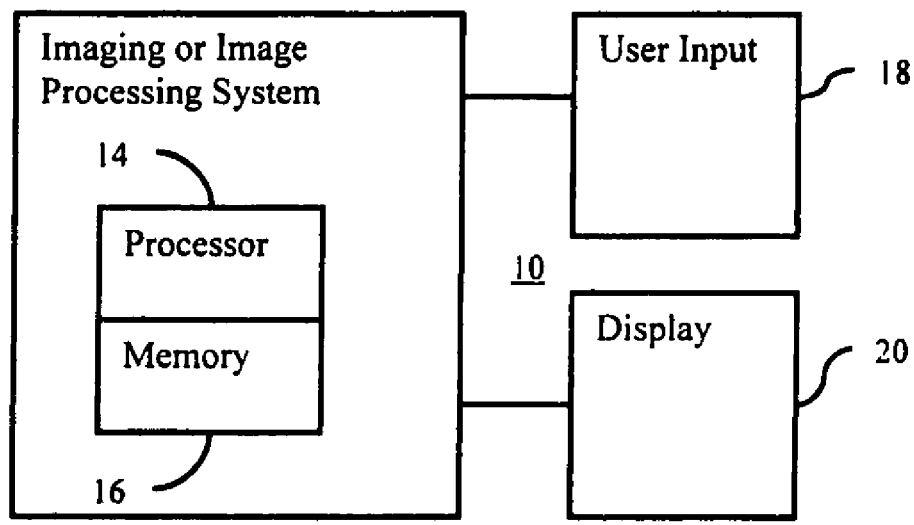
FIG. 1 is a block diagram of one embodiment of a system for cross-referencing a measurement in medical imaging.

FIG. 1 shows a system 10 for cross-referencing measurements in diagnostic medical imaging. The system 10 is a medical imaging system, such as an ultrasound system, a computed tomography system, a magnetic resonance system, an x-ray system, a positron emission system, combinations thereof, or other now known or later developed medical imaging system. In alternative embodiments, the system 10 is a personal computer, workstation, image archival system, or other image processing system.

The system 10 includes a processor 14, a memory 16, a user input 18, and a display 20. Additional, different, or fewer components may be provided. For example, the user input 18 is not provided where measurements are automated. As another example, the display 20 is not provided where differences or images are transmitted rather than displayed. In another example, front-end scanning components are provided, such as ultrasound beamformers and transducer, x-ray emitter and detector, or magnetic coils.

The memory 16 is a random access memory, read only memory, buffer, cache, hard drive, optical media, removable media, portable media, database, combinations thereof, or other now known or later developed memory. The memory 16 is accessed by the processor 14. The processor 14 or other devices, such as an input/output device or network connection, allow import and export from the memory 16 of data or instructions.

The memory 16 is operable to store sets of data. The sets of data correspond to frames of data, such as associated with two-dimensional images. The sets of data may be for one-dimensional display or scans, such as a line of M-mode or spectral Doppler ultrasound data, or for three-dimensional representations. The sets may be associated with a substantially same time or period. For example, the sets of data represent a region over a period, such as one or more heart cycles. Alternatively, different sets correspond to different times than other sets.

Each set of data represents a same region. One set of data may represent different regions as well, such as both sets representing an overlapping or same region and one or both sets also representing other adjacent regions. The region is a one, two, or three-dimensional portion of a patient being scanned, such as an interior portion of the patient.

The sets of data relate to different modes or imaging system channels. For example, one set of data is for one one mode and another set of data is for another mode. The different modes are for different imaging systems or acquisition physics. For example, different modes include ultrasound, x-ray, computed tomography, magnetic resonance, positron emission, or other now known or later developed type of imaging. One or more sets of data are acquired with one mode (e.g., ultrasound), and one or more other sets of data are acquired with a different mode (e.g., computed tomography).

Alternatively or additionally, the sets of data relate to different channels or types of detection using a same mode or imaging physics. For example, a same imaging system has different types of detection. Different imaging systems may be used for different types of detection using a same mode or physics. In one embodiment, different ultrasound types of detection are used. For example, the different channels are any two or more of B-mode, Doppler or flow mode (e.g., velocity, variance, power, or combinations thereof), strain (e.g., strain or strain rate), harmonic, fundamental, spectral Doppler, M-mode, or other types of detection. Each channel uses a scan with ultrasound, but operates differently to detect different information.

The processor 14 is a general processor, control processor, digital-signal processor, application specific integrated circuit, field programmable gate array, analog circuit, digital circuit, combinations thereof, or other now known or later developed device for processing data. The processor 14 is a single device or multiple devices, such as associated with sequential or parallel processing.

Figure 2:
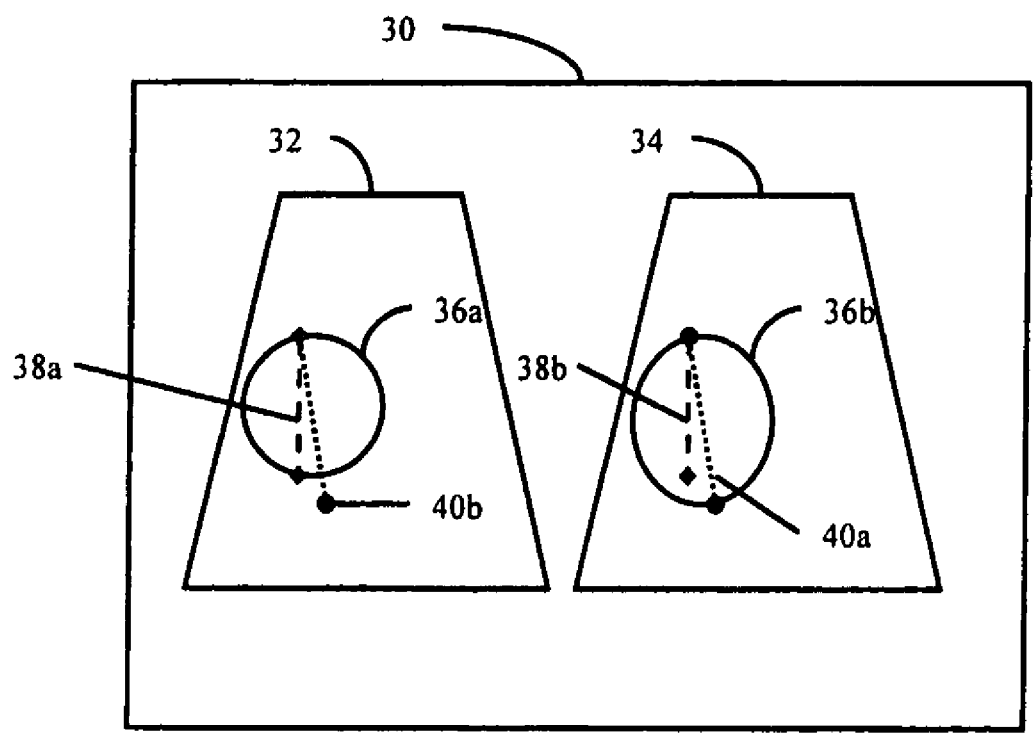
FIG. 2 is a graphical representation of one embodiment of a display of cross-referenced measurements.

The processor 14 is operable to identify measurement locations. For example, FIG. 2 shows a display 30 of two images 32, 34. The end points of the lines 36, 38 or other portions of the lines are measurement locations associated with a length measurement. Measurement locations associated with areas, volumes, flow rate, or other types of measurements may be identified.

The locations are identified from user input, automatically, or semi-automatically. In one embodiment, the processor 14 receives one or more user selections. In an example from FIG. 2, the processor 14 may receive user indication of the locations of the circles for the end points of the line 40a. The processor 14 identifies the locations of the end points from the user input. The user may trace a boundary, draw a line, select a point, or provide other input for a location or locations associated with a measurement.

In another embodiment, the processor 14 processes the data to identify the locations. In an example from FIG. 2, the processor 14 detects a boundary (e.g., oval 36b) and detects desired locations along the boundary, such as the end points of the line 40a. Any image process may be used, such as region growing, filtering, thresholding, pattern matching, correlation, or combinations thereof. For example, an algorithm is operable to identify locations or boundaries along a heart wall or at valves. Any algorithm may be used for identifying locations of interest from data.

In another embodiment, the processor 14 uses user input to semi-automatically identify the locations. For example, the user selects points along a boundary. The processor 14 determines a continuous or partial boundary line as a function of the data and the user entered points. As another example, the user selects end points, and the processor 14 determines a line between the end points.

The locations are identified by the processor 14 for one or multiple measurements. For example, both a length and an area are determined. As another example, both an area and a flow rate are determined.

In another example, two of the same type of measurements are determined, such as two lengths. The measurements are based on or originate from one or multiple types of data. For example, a same measurement is performed in two different types of data. One type of data is used to determine a measure (e.g., length) of a scanned object. A different type of data is used to determine the same measure (e.g., length) of the scanned object. The measurement is performed twice for a same object, but based on different sets of data. The measurements are performed separately, such as measuring for each set independent of measurement in other sets. Alternatively, one of the measurements is independent, but the other is dependent. One set of data may include data from multiple channels or modes. The same measurement is performed in two or more data sets based on at least one type of data being different between the sets.

The processor 14 may generate indicators associated with the measurements, such as reflections of a measurement in one image onto another image. Based on positional measurements or scanning parameters, the relative alignment of the different sets of data is determined. After alignment, the line, area, trace, or other measurement indicator on one image is positioned at a same location in another image. The indicator may or may not align with represented objects of the scanned regions, such as where the original measurement is performed in a lower resolution mode or channel and is offset compared to higher definition data or image.

FIG. 2 shows an example. A length is measured. In the image 32 for one type of data, the object 36a appears generally circular. A diameter is determined along line 38a in the image 32. The same line 38a is reflected on the other image 34 of another type of data as line 38b. Since the object 36b has a different spatial orientation, such as appearing oval, in the other image 34, the reflected line 38b does not align with the object 36b. Similarly, the same diameter is measured in the other image 34. This diameter is indicated by the line 40a. The line 40a is reflected on the image 32 as line 40b.

The processor 14 is operable to determine a difference between measurements. Where the same measurement (e.g., length) is performed twice, the processor 14 determines a difference. For example, a difference in length of the lines 38 and 40 (see FIG. 2) is determined. As another example, an amount of offset, such as a distance between non-aligned end points in one, two, or three dimensions is determined. In other examples, other characteristics (e.g., variance, mean, median, average, standard deviation, nearest approach, or correlation) of a difference between two or more measures are determined.

The user input 18 is a keyboard, mouse, trackball, touch pad, touch screen, buttons, knobs, sliders, combinations thereof, or other now known or later developed user input device. The user input 18 receives user input associated with a user interface. For example, selections associated with positions on a display are received. The user input is output to the processor 14, such as outputting user indication of measurements or locations associated with a measurement. The user input 18 may receive and trigger activation, such as a triggering determination of a measurement based on previously input locations.

The display 20 is a monitor, CRT, LCD, plasma, projector, touch screen, combinations thereof, or other now known or later developed display device. The display 20 connects with the processor 14 directly or indirectly for receiving images with or without measurement indicators.

The display 20 is operable to display one or more images. For example and as shown in FIG. 2, the display 20, 30 includes two images 32, 34. Each image corresponds to a different type of data, such as different combinations of data. Different data sets are used to generate the images 32, 34. The data sets are filtered, detected, scan converted, or otherwise processed into display values. The images are grey scale, color, or grey scale and color. The images 32, 34 are displayed as substantially the same time. The images 32, 34 may be on adjacent or spaced apart separate monitors, or on a same monitor. The update rate is the same or different.

One or more of the images 32, 34 may include indications associated with the measurements. For example, a measurement in one image 32 is reflected in the other image 34. Measurements in the other image 34 may be reflected in the one image 32. Alternatively, the measurements for different images 32, 34 are not reflected in other images 34, 32. The indications include marks, points, lines, highlighting, shading, texturing, coloring, regions, or other designations.

For reflecting a measurement in one data set on an image for another data set, the corresponding indicators may be coded or matched. For example in FIG. 2, the line 38a and the reflected line 38b have a same texture (e.g., dashed) and/or a same color. The line 40a and the reflected line 40b have a same texture (e.g., dotted) and/or same color. The texture, color, or other match indication is different for the different instances of the same measurement (e.g., dashed verse dotted lines 38, 40).

The display 20 may be operable to display an indication of a difference between two of the same measurements using different data. For example, a line connecting measurement locations is provided. Other visual indicators of difference, such as shading or coloring non-overlapping areas, may be used. As another example, a quantification of the difference is displayed to the user.

Figure 3:
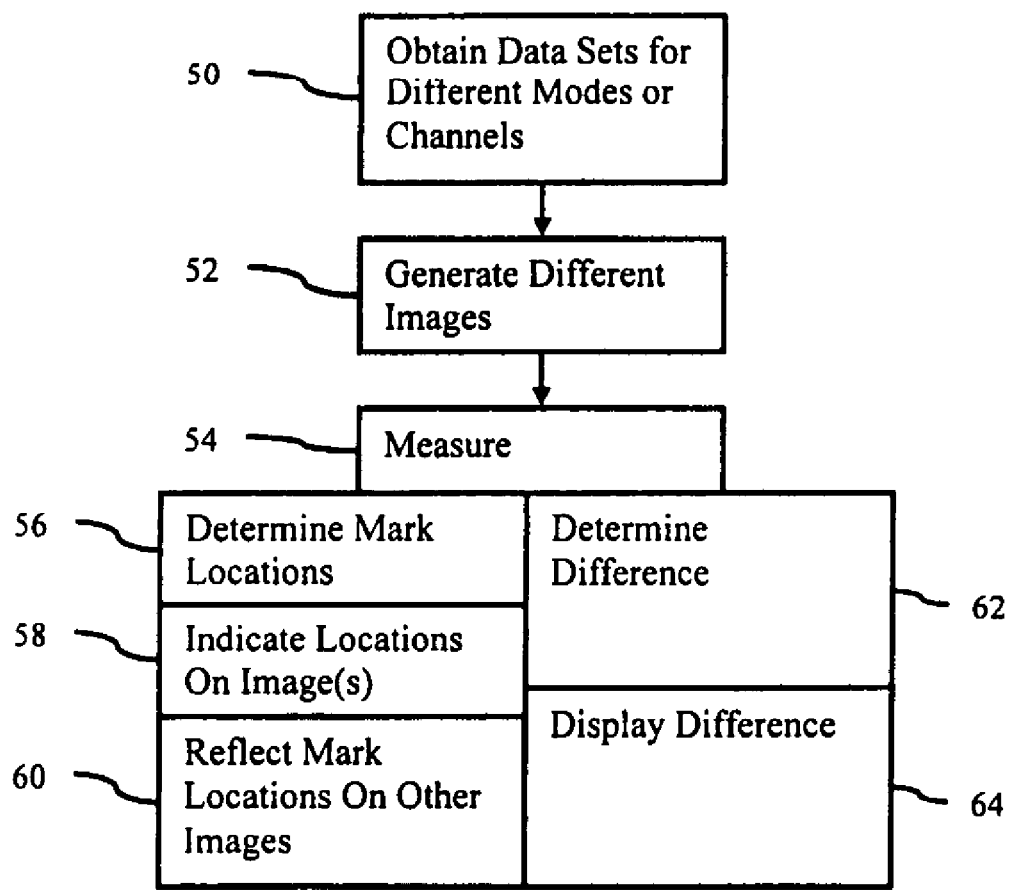
FIG. 3 is a flow chart diagram representing a method for cross-referencing a measurement in medical imaging according to one embodiment.

FIG. 3 shows a method for cross-referencing measurements in diagnostic medical imaging. The method is implemented with the system 10 of FIG. 1 or a different system. The acts are performed in the order shown or a different order. Additional, different, or fewer acts may be provided. For example, the method is performed without acts 62 and 64, or without acts 56, 58, and 60. As another example, act 52 is optional.

In act 50, data sets of different types of data are obtained. The data is obtained by scanning, such as real-time scanning in a medical imaging mode. The scanning may be performed by a same system or different systems. The data for different modes or channels is obtained. Alternatively, the data is retrieved or received from storage or a remote device. For example, previous scans are loaded from a medical patient record.

The different data sets represent a same region of a patient. The different data may be associated with different acquisition times or a substantially same time. For example, one data set may have been acquired by scanning more recently, such as by minutes, hours, days, or years, than another data set. As another example, two or more data sets are obtained by interleaved scanning at a substantially same time.

The data sets comprise different types of data, such as associated with different modes and/or channels. For example, data sets are obtained with a same type of scanning and different channels for detection, such as ultrasound scanning with B-mode and strain detection (e.g., elasticity imaging mode where both B-mode image and the strain image are generated and displayed side-by-side on the screen). As another example, two or more different types of scanning are used to obtain the data.

In act 52, images are generated. The images are displayed adjacent to each other, such as on a same screen at a substantially same time. Separate spatial or temporal displays may be used. Each image is generated as a function of one or more data sets. The different images are generated as a function of at least one different data set.

In act 54, a measurement associated with one or more of the data sets and/or images is performed. The measurement is performed by a processor, automatically, semi-automatically, or as a function of user input. The same measurement may be performed using different data and/or images. For example, the length or other characteristic of a same object represented by the different data or images is measured from the different data or images. The measurement is performed in the same way from each of the data sets.

The measurement is reflected in another image as represented by acts 56, 58, and 60, or used to determine a different with the same measurement in with other data as represented by acts 62 and 64. Both reflection and difference determination may be used.

In act 56, one or more mark locations are determined for a measurement. The mark locations correspond to spatial locations represented by data, such as locations on an image. The mark location may be received from a user indication on the image. The mark location may be determined with a processor as a function of processor analysis of data. The mark location may be determined from a combination of user input and processor analysis.

The mark locations are associated with the measurement. For example, the mark location is an end point of a distance measurement; a point location; a point, line, area, or volume location for a border; a circumference of an area; a surface of a volume; or combinations thereof.

The mark locations are determined for each measurement. Different measurements may be performed for one data set and/or image. A same measurement may be performed for different data sets and/or images.

In act 58, one or more indications associated with the measurements or mark locations are displayed on an image. Images are generated from the data sets. Any measurements performed from a data set or image are shown on the corresponding image. Indications of each of the measurements from the data sets are included in each of the images.

In act 60, the mark locations for measurements are reflected. For example, the indications from one image are reflected in another image. Where two or more images are displayed at a same time, the indications for a measurement associated with one of the images are reflected in the other images simultaneously. Mark locations associated with different images may be reflected in other images. A mark location may be reflected in a displayed image from a measurement associated with a no image or previously displayed image.

The reflected mark locations are indicated in a same or different way in the different images. The same shape, size, color, texture, or combinations thereof are used for the measurement indicator and the reflection of the measurement in the different image. Other measurements, such as the same measurement performed as a function of different data, have the same or different chrematistics. Similar, but different, characteristics may be used for the same measurement, such as differing only in color, texture, and/or point shapes. For example, the length of the same object measured separately from different types of data is indicated with a line for both measurements, but different colors. The reflections have the corresponding look as, but may differ from, the mirrored indicator.

The reflected mark locations may not align with the object being measured. The images and data are aligned. Position measurements, and/or scan parameters are used to align the data and images. Correlation or other processing may alternatively be used for alignment. The alignment is in one, two, or three dimensions. Translation, rotation, or both translation and rotation alignment may be used. The alignment may include scaling.

After alignment of the data, the object may still be associated with different spatial locations due to resolution, shadows, or other characteristics of the physics of scanning or detection. Due to the possible misalignment, the mark locations may not be at a same location relative to the imaged object in the different images. The reflected mark locations show this difference.

In one example embodiment of acts 56, 58, and 60, different channel data (B-mode and strain) and associated images are displayed. The user manually indicates the mark locations for a measurement. For a lesion, the user may trace the lesion border on a B-mode image. The same trace is duplicated on a strain image with proper scale and translation. When the operator traces the lesion border on the strain image, the same trace is duplicated and displayed on the B-mode image with proper scale and translation. Since the B-mode and strain image are the representation of two different physical phenomena of the same lesion, the lesion borders may or may not be present at the same locations depending on the lesion property.

The acts 56, 58, and 60 may be repeated as represented in the example above. The same or different measurement is performed in the same or different image. The mark locations for the additional measurement are reflected into one or more other images.

In one embodiment for acts 62 and 64, the same measurement is performed, but as a function of different types of data. The difference may be diagnostically useful. The measurements may be performed with or without reflections, indicating mark locations, or displaying images.

In act 62, a difference between measurements is determined. The difference is a mathematical difference (i.e., subtraction) or other difference characteristic (e.g., location, translation, rotation, shape, spatial distribution, or statistical relationship). More than one difference may be calculated. Different differences may be combined or maintained separately. The difference may be associated with an expected difference, such as calculating a deviation in the actual difference from an expected difference. The difference of the measurements from two or more measurements provides information for decision making in diagnosis and surgery planning.

In act 64, information is displayed as a function of the difference. The difference is displayed, such as displaying text indicating a difference. A connector or highlighted area may indicate a difference between two measurements. The difference is displayed with or without measurement indicators. The measurement indicators may indicate the difference. Text, shading, color, graphics, shapes, texture, or other indication may be used to highlight the difference in an image. The difference may be highlighted in a plurality of images. The difference may be indicated in a same or different way for different images.

Referring to FIG. 1, the memory 16 may be used for instructions. The memory 16 is a computer readable storage medium having stored therein data representing instructions executable by a programmed processor for cross referencing measurements in diagnostic medical imaging. The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for cross-referencing a measurement in diagnostic medical imaging, the method comprising:
   obtaining first data of a first type representing a region;
   obtaining second data of a second type representing the region, the first type different than the second type;
   generating a first image as a function of the first data;
   generating a second image as a function of the second data;
   determining a first mark location, for a first measurement, on the first image; and
   reflecting the first mark location on the second image;
   wherein the same type of scanning comprises ultrasound scanning, and the different modes of detection comprise B-mode and strain.

2. The method of claim 1 wherein obtaining first and second data comprises obtaining with a same type of scanning and different modes of detection.

3. The method of claim 1 wherein obtaining the first and second data comprises obtaining with two different types of scanning.

4. The method of claim 1 wherein generating the first and second images comprises generating the first and second images at a substantially same time for adjacent display.

5. The method of claim 1 wherein determining the first mark location comprises receiving a user indication of the first mark location on the first image, determining the first mark location with a processor as a function of processor analysis of the first data, or combinations thereof.

6. The method of claim 1 wherein reflecting comprises simultaneous display of a first mark at the first mark location on the first and second images.

7. The method of claim 1 wherein reflecting comprises generating a first mark with a same shape, size, color, texture, or combinations thereof on the first and second images.

8. The method of claim 1 further comprising:
   determining a second mark location, for a second measurement, on the second image, the first and second measurements being a same measurement but for the different first and second images; and
   reflecting the second mark location on the first image.

9. The method of claim 8 further comprising:
   determining a difference between the first and second measurements.

10. The method of claim 1 wherein determining the first mark location comprises determining the first mark location for an end point of a distance, for a border location, for a circumference of an area, for a surface of a volume, or combinations thereof.

11. A system for cross-referencing measurements in diagnostic medical imaging, the system comprising:
    a memory operable to store first and second sets of data for first and second different modes or imaging system channels, respectively;
    a processor operable to identify first and second measurement related locations for a same measurement separately determined from the first and second sets of data, respectively;
    a display operable to display first and second images corresponding to the first and second sets of data, respectively, and operable to include indications of the first and second measurement related locations in each of the first and second images;
    wherein the same type of scanning comprises ultrasound scanning, and the different modes of detection comprise B-mode and strain.

12. The system of claim 11 wherein the first and second sets of data comprise data for different modes associated with different imaging systems.

13. The system of claim 11 wherein the first and second sets of data comprise data for different imaging system channels of a same imaging system.

14. The system of claim 11 wherein the first and second sets of data represent a same region, and wherein the display is operable to display the first and second images and the indications at a substantially same time.

15. The system of claim 11 further comprising:
    a user input operable to output to the processor user indication of the first and second measurement related locations.

16. The system of claim 11 wherein the indications of the first measurement related location in the first and second images have a same color, texture, or color and texture, and wherein the indications of the second measurement related location in the first and second images have a same color, texture, or color and texture, the indications for the first measurement related location different than the indications for the second measurement related location.

17. The system of claim 11 wherein the processor is operable to determine a difference between the measurement based on the first set of data and the measurement based on the second set of data.

18. In a computer readable storage medium having stored therein data representing instructions executable by a programmed processor for cross-referencing measurements in diagnostic medical imaging, the storage medium comprising instructions for:
    obtaining data sets of different types of data, the data sets representing a same region of a patient;
    measuring in a same way from each of the data sets; and
    determining a difference between the measurements of the data sets of different types of data;
    wherein the same type of scanning comprises ultrasound scanning, and the different modes of detection comprise B-mode and strain.

19. The instructions of claim 18 further comprising:
    generating images for the data sets;
    including indications of each of the measurements from the data sets in each of the images.

20. The instructions of claim 18 further comprising:
    displaying information as a function of the difference.

21. The instructions of claim 20 wherein displaying comprises highlighting the difference in an image.

* * * * *